J. P. GRIFFIN.

ASH TRAY.

APPLICATION FILED NOV. 16, 1921.

Reissued May 23, 1922. 15,361.

WITNESS:

R. P. Kitchel.

INVENTOR

John P. Griffin,

BY

Frank S. Busser

ATTORNEY.

UNITED STATES PATENT OFFICE.

JOHN P. GRIFFIN, OF WADDINGTON, NEW YORK, ASSIGNOR TO GRIFFIN CHOKER ASH TRAY INC., OF DOVER, DELAWARE, A CORPORATION OF DELAWARE.

ASH TRAY.

15,361. Specification of Reissued Letters Patent. Reissued May 23, 1922.

Original No. 1,342,805, dated June 8, 1920, Serial No. 300,020, filed May 27, 1919. Application for reissue filed November 16, 1921. Serial No. 515,730.

*To all whom it may concern:*

Be it known that JOHN P. GRIFFIN, a citizen of the United States, formerly residing at New York city, in the county of New York and State of New York, and who now resides at Waddington, county of St. Lawrence, and State of New York, has invented a new and useful Improvement in Ash Trays, of which the following is a specification.

This invention relates to ash trays and has for its object the provision of an ash tray particularly adapted for the use of cigarette smokers and provided with means for holding ashes and butts or stumps, associated with means whereby a burning cigarette stump will be speedily extinguished when engaged with said means, whereby the continued burning of the butt or stump will be prevented and whereby danger of fire and the like from carelessness will be eliminated.

An important object is the provision of an ash tray of this character which is so formed as to provide means whereby a burning stump will be smothered and which is also so constructed that the ashes upon the stump will fall into a receptacle for avoiding clogging of the smothering or extinguishing spaces.

An additional object is the provision of an ash tray of this character which will be very simple and inexpensive in manufacture, highly efficient in use, durable in service, and which may be readily disassembled for cleaning.

A preferred embodiment of the invention is illustrated in the accompanying drawing, in which—

Figure 1:
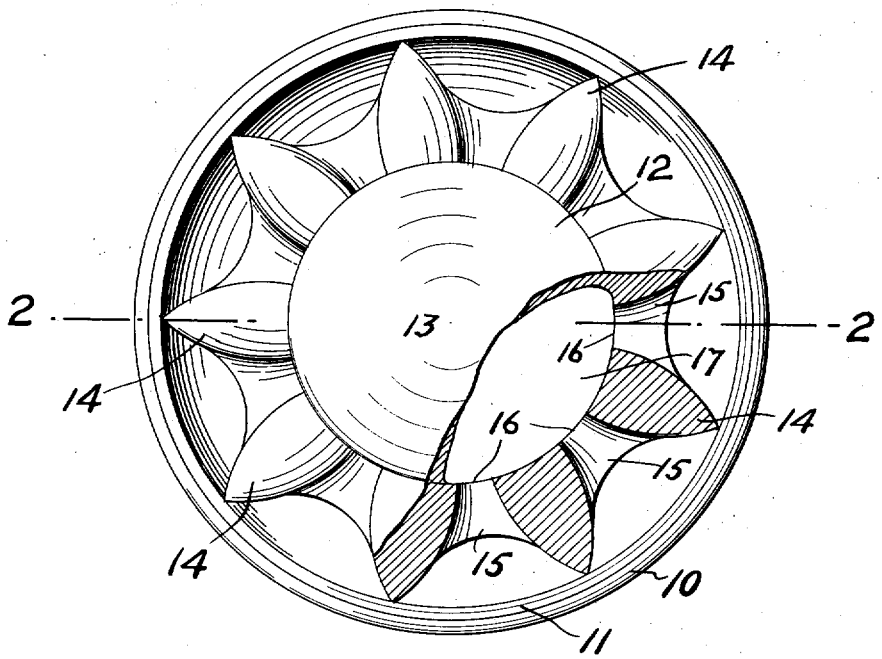
Figure 2:
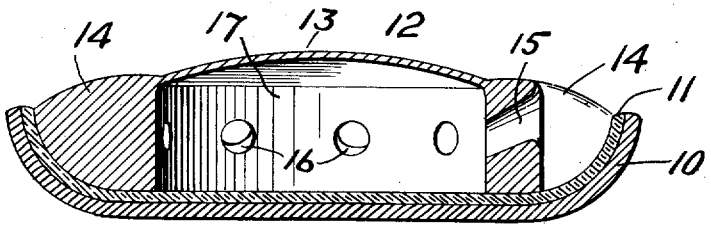

Fig. 1 is a plan view of an ash tray constructed in accordance with the invention, a portion thereof being broken away and in section, and Fig. 2 is a cross-sectional view.

Referring more particularly to the drawing, the numeral 10 designates the base of the device which is preferably circular and dish shape, and preferably provided with a glass lining 11. The member 10 may be provided with any suitable pedestal whereby it may be supported from the floor or table, or any other article of furniture.

Disposed within the base 10, or within the lining 11 if the base is so equipped, is a ring member 12 formed somewhat in the shape of a star or asterisk and which may be formed of glass, metal, or other suitable material and is of a size and weight adapted to retain itself in position within the base. This member 12 includes a top portion 13 and also includes a plurality of arms or points 14 between which are formed cigarette receiving perforations 15 which terminate at their inner or lower ends in holes 16, preferably oval or elliptical in shape to accord with the popular shape of ready made cigarettes, and these holes open into a central opening 17 in the member 12. It will be observed that the perforations are each tapered or reduced in diameter from the cigarette receiving end toward the terminal hole 16.

In the use of the device it will be seen that in order to extinguish a lighted or smoldering cigarette or cigarette stump, it it merely necessary for the operator to push the lighted end of the cigarette into any one of the perforations 15 until its inward movement is stopped by being wedged within a restricted part of the perforation near the hole 16. The thereby effected peripheral compression of the lighted end of the cigarette will choke or smother the fire and effect extinguishment in about seven seconds. Any ashes that fall off the extinguished cigarette will drop into the central opening 17.

It will be understood that the invention is not limited to the specific construction shown in the drawings, as changes in construction may be resorted to a degree which will not depart from the scope of the subjoined claims.

Having now fully described my invention, what I claim and desire to protect by Letters Patent is:

1. An ash tray comprising a base receptacle having upwardly curved sides merging into the bottom thereof, a glass lining conformingly engaging within said base receptacle, and a body conformingly engaged within said lining and projecting above the top of the side flanges thereof, said body being provided centrally with an opening extending to said lining and terminating short of the top of the body whereby the top of the opening will be closed, said body being somewhat stella form whereby to provide a plurality of points engaging the inner periphery of the lining, the periphery of said body between said points being spaced from the lining to provide recesses, and said body being provided between said points with outwardly flaring recesses communicating with said opening.

2. An ash tray comprising a base member providing a receptacle, a substantially saucer shaped glass lining conformably engaging within said receptacle, and a ring member resting upon and engaging the walls of said lining and having extending completely therethrough a plurality of downwardly extending perforations the walls of which are tapered toward their lower ends.

3. An ash tray comprising a base member providing a dish shaped recess and a ring member loosely seated within said recess and engaging the walls thereof and provided with a plurality of downwardly tapered perforations extending through the ring member and opening into said recess and adapted to receive the lighted end of cigarettes, said ring member being relatively heavy to retain it in position in the recess in the base member.

In testimony of which invention I have hereunto signed at Philadelphia, Pennsylvania, on this 3rd day of February, 1922.

JOHN P. GRIFFIN.

Witnesses:

MARY E. WALKER,
SARA KESSLER.